(12) United States Patent
Elms et al.

(10) Patent No.: US 7,362,552 B2
(45) Date of Patent: Apr. 22, 2008

(54) ARC FAULT CIRCUIT INTERRUPTER

(75) Inventors: Robert T. Elms, Monroeville, PA (US);
Kevin L. Parker, Pittsburgh, PA (US);
Joseph C. Zuercher, Brookfield, WI (US)

(73) Assignee: Eaton Corporation, Cleveland, OH (US)

(*) Notice: Subject to any disclaimer, the term of this patent is extended or adjusted under 35 U.S.C. 154(b) by 141 days.

(21) Appl. No.: 10/895,158

(22) Filed: Jul. 20, 2004

(65) Prior Publication Data
US 2006/0018060 A1    Jan. 26, 2006

(51) Int. Cl.
*H02H 3/00* (2006.01)
(52) U.S. Cl. ......................................... 361/42
(58) Field of Classification Search .................. 361/42, 361/44
See application file for complete search history.

(56) References Cited

U.S. PATENT DOCUMENTS

| | | | |
|---|---|---|---|
| 5,224,006 A | 6/1993 | MacKenzie et al. | |
| 5,691,869 A | 11/1997 | Engel et al. | |
| 5,818,237 A | 10/1998 | Zuercher et al. | |
| 5,839,092 A | 11/1998 | Erger et al. | |
| 6,246,556 B1 | 6/2001 | Haun et al. | |
| 6,259,996 B1 | 7/2001 | Haun et al. | |
| 6,477,021 B1 | 11/2002 | Haun et al. | |
| 6,650,516 B2 | 11/2003 | Langford et al. | |
| 6,653,219 B2 | 11/2003 | Fukuyama | |
| 2003/0072113 A1* | 4/2003 | Wong et al. | 361/5 |
| 2003/0227290 A1 | 12/2003 | Parker | |
| 2004/0042137 A1 | 3/2004 | Wong et al. | |

OTHER PUBLICATIONS

Microchip Technoogy Inc., "Save More Energy with PIC Microcontrollers featuring nanoWatt Technology", www.microchip.com/nanowatt, 2003, 2 pp.
IAEI News, "Five New Categories for AFCI Devices Under UL 1699", 2003, p. 94.
Underwriters Laboratories, "Arc Fault Circuit Interrupters—UL 1699", Dec. 2000, pp. 33, 34, 43-45.

* cited by examiner

*Primary Examiner*—Michael Sherry
*Assistant Examiner*—Lucy Thomas
(74) *Attorney, Agent, or Firm*—Martin J. Moran

(57) ABSTRACT

An arc fault circuit interrupter includes line and load terminals, separable contacts, a current sensor sensing current flowing between the terminals and associated with one type of load, and a first arc fault detection circuit generating a first trip signal responsive to the sensed current. A second arc fault detection circuit collects a plurality of sensed current samples for a current line cycle and also for a previous line cycle, determines a total current value from a peak current of the current line cycle samples, employs the total current value and some of the samples to determine the type of load, and generates a second trip signal responsive to the sensed current and the determined type of load. A trip circuit generates a third trip signal responsive to the first and second trip signals. An operating mechanism opens the contacts responsive to the third signal.

26 Claims, 14 Drawing Sheets

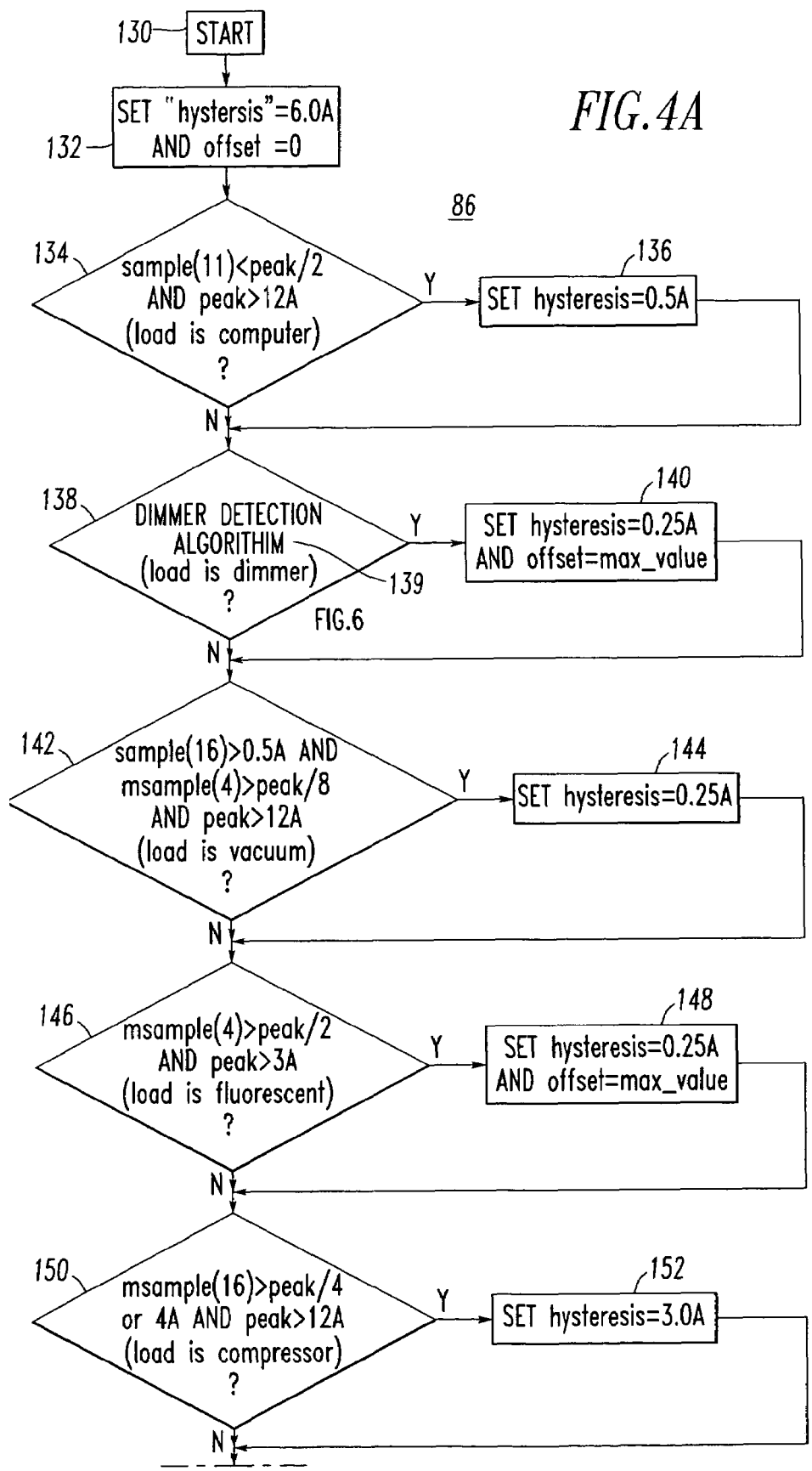

ARC FAULT CIRCUIT INTERRUPTER

BACKGROUND OF THE INVENTION

1. Field of the Invention

This invention relates generally to circuit interrupters including an arc fault trip mechanism and, more particularly, to such circuit interrupters, which respond to sputtering arc faults.

2. Background Information

Arcing is a luminous discharge of electricity across an insulating medium, usually accompanied by the partial volatilization of electrodes. An arc fault is an unintentional arcing condition in an electrical circuit. Arc faults can be caused, for instance, by worn insulation between adjacent bared conductors, by exposed ends between broken conductors, by faulty electrical connections, and in other situations where conducting elements are in close proximity.

Arc faults in systems can be intermittent since the magnetic repulsion forces generated by the arc current force the conductors apart to extinguish the arc. Mechanical forces then bring the conductors together again in order that another arc is struck.

Circuit interrupters include, for example, circuit breakers, contactors, motor starters, motor controllers, other load controllers and receptacles having a trip mechanism. Circuit breakers are generally old and well known in the art. Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which is heated and bends in response to a persistent overcurrent condition. The bimetal, in turn, unlatches a spring powered operating mechanism, which opens the separable contacts of the circuit breaker to interrupt current flow in the protected power system. An armature, which is attracted by the sizable magnetic forces generated by a short circuit or fault, also unlatches, or trips, the operating mechanism.

Recently, there has been considerable interest in providing protection against arc faults. Because of their intermittent and high impedance nature, arc faults do not generate currents of either sufficient instantaneous magnitude or sufficient average RMS current to trip the conventional circuit interrupter. Even so, the arcs can cause damage or start a fire if they occur near combustible material. It is not practical to simply lower the pick-up currents on conventional circuit breakers, as there are many typical loads, which draw similar currents and would, therefore, cause nuisance trips. Consequently, separate electrical circuits have been developed for responding to arc faults. See, for example, U.S. Pat. Nos. 5,224,006; and 5,691,869.

For example, an arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from ground faults (e.g., greater than 40 mA) and line-to-neutral faults (e.g., greater than 75 A); (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from line-to-ground faults (e.g., greater than 75 A) and line-to-neutral faults (e.g., 5 to 30 A, and greater than 75 A); (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

UL 1699 is a specification that governs the performance of AFCI products including branch/feeder type (AVZQ); outlet circuit type (AWCG); portable type (AWDO); cord type (AWAY); and combination type (AWAH) AFCIs. A carbonized path arc clearing time test is conducted in which the total clearing time before the AFCI trips shall not exceed specified arc test clearing times based upon different levels of test current (i.e., 5 A; 10 A; 15 A or 20 A; 22.5A or 30A). Furthermore, the AFCI must be tested with various masking loads (i.e., a 5 A resistive load; a vacuum cleaner; an electronic switching mode power supply (or supplies); a capacitor (air compressor type) motor; an electronic lamp dimmer; two fluorescent lamps plus a 5 A resistive load) using the arc tests.

There exists the need for an AFCI, which is responsive to the UL carbonized path arc clearing time test, without failing to trip in response to such test in the presence of various masking loads, and without falsely tripping in the presence of only such masking loads.

Accordingly, there is room for improvement in AFCIs.

SUMMARY OF THE INVENTION

These needs and others are met by the present invention, which provides an arc fault detection circuit adapted to collect a plurality of samples of sensed current for a current line cycle and a plurality of samples of sensed current for the line cycle prior to the current line cycle. The second arc fault detection circuit determines a total current value from a peak current of the samples of the sensed current for the current line cycle, employs the total current value and some of the samples to determine the type of load, and generates a trip signal responsive to the sensed current and the determined type of load.

In accordance with one aspect of the invention, an arc fault circuit interrupter for an electrical circuit associated with one of a plurality of different types of loads comprises: a line terminal; a load terminal; separable contacts electrically connected between the line terminal and the load terminal; a current sensor adapted to sense current flowing between the line terminal and the load terminal and through the separable contacts, the current associated with one of the types of loads, the sensed current including a plurality of line cycles; a first arc fault detection circuit adapted to generate a first trip signal responsive to the sensed current from the current sensor; a second arc fault detection circuit adapted to collect a plurality of samples of the sensed current for a current one of the line cycles and a plurality of samples of the sensed current for one of the line cycles prior to the current one of the line cycles, to determine a total current value from a peak current of the samples of the sensed current for the current one of the line cycles, to employ the total current value and some of the samples to determine the one of the types of loads, and to generate a second trip signal responsive to the sensed current from the current sensor and the determined one of the types of loads; a trip circuit adapted to generate a third trip signal responsive to the first trip signal or the second trip signal; and an operating mechanism adapted to open the separable contacts responsive to the third trip signal.

The second arc fault detection circuit may compare at least one of the samples of the sensed current for the current one of the line cycles to a predetermined fraction of the total current value and compare the total current value to a predetermined value, in order to determine the one of the types of loads.

The determined one of the types of loads is selected from the group comprising a computer, an electronic lamp dimmer, a drill, a capacitor start motor, a fluorescent lamp and a vacuum cleaner.

As another aspect of the invention, an arc fault circuit interrupter comprises: a line terminal; a load terminal; separable contacts electrically connected between the line terminal and the load terminal; a current sensor adapted to sense current flowing between the line terminal and the load terminal and through the separable contacts, the sensed current including a plurality of line cycles; an arc fault detection circuit adapted to collect a plurality of samples of the sensed current for a current one of the line cycles and a plurality of samples of the sensed current for one of the line cycles prior to the current one of the line cycles, to determine a total current value from a peak current of the samples of the sensed current for the current one of the line cycles, and to generate a trip signal responsive to the sensed current from the current sensor; and an operating mechanism adapted to open the separable contacts responsive to the trip signal, wherein the line cycle corresponds to a line voltage having a line cycle with a positive zero crossing and a negative zero crossing; wherein the arc fault detection circuit collects a first one of the samples of the sensed current at about the positive zero crossing of the line cycle of the line voltage and an Nth one of the samples of the sensed current at about the negative zero crossing of the line cycle of the line voltage; wherein the arc fault detection circuit collects and saves the samples of the sensed current for four consecutive ones of the line cycles; wherein for three consecutive ones of the line cycles the arc fault detection circuit determines differences between each of the samples of one of the line cycles and each of the samples of an immediately previous one of the line cycles and determines a maximum positive value and a maximum negative value from the differences for the three consecutive ones of the line cycles; wherein the arc fault detection circuit determines whether there is one or both of a local maximum value and a local minimum value from the determined maximum positive value and the determined maximum negative value over the three consecutive ones of the line cycles; wherein the arc fault detection circuit determines a hysteresis value based upon the one or both of the local maximum value and the local minimum value for the current one of the line cycles; and wherein the arc fault detection circuit determines if the local maximum value or the local minimum value is greater than the hysteresis value and responsively adds the total current value to a trip tally for the trip signal.

BRIEF DESCRIPTION OF THE DRAWINGS

A full understanding of the invention can be gained from the following description of the preferred embodiments when read in conjunction with the accompanying drawings in which:

FIGS. 4A-4C form a flowchart of a differential loads masking test algorithm for the processor of FIG. 1.

DESCRIPTION OF THE PREFERRED EMBODIMENTS

The present invention is described in association with a single pole branch/feeder arc fault circuit interrupter (AFCI), although the invention is applicable to a wide range of AFCIs including one or more poles.

Figure 1:
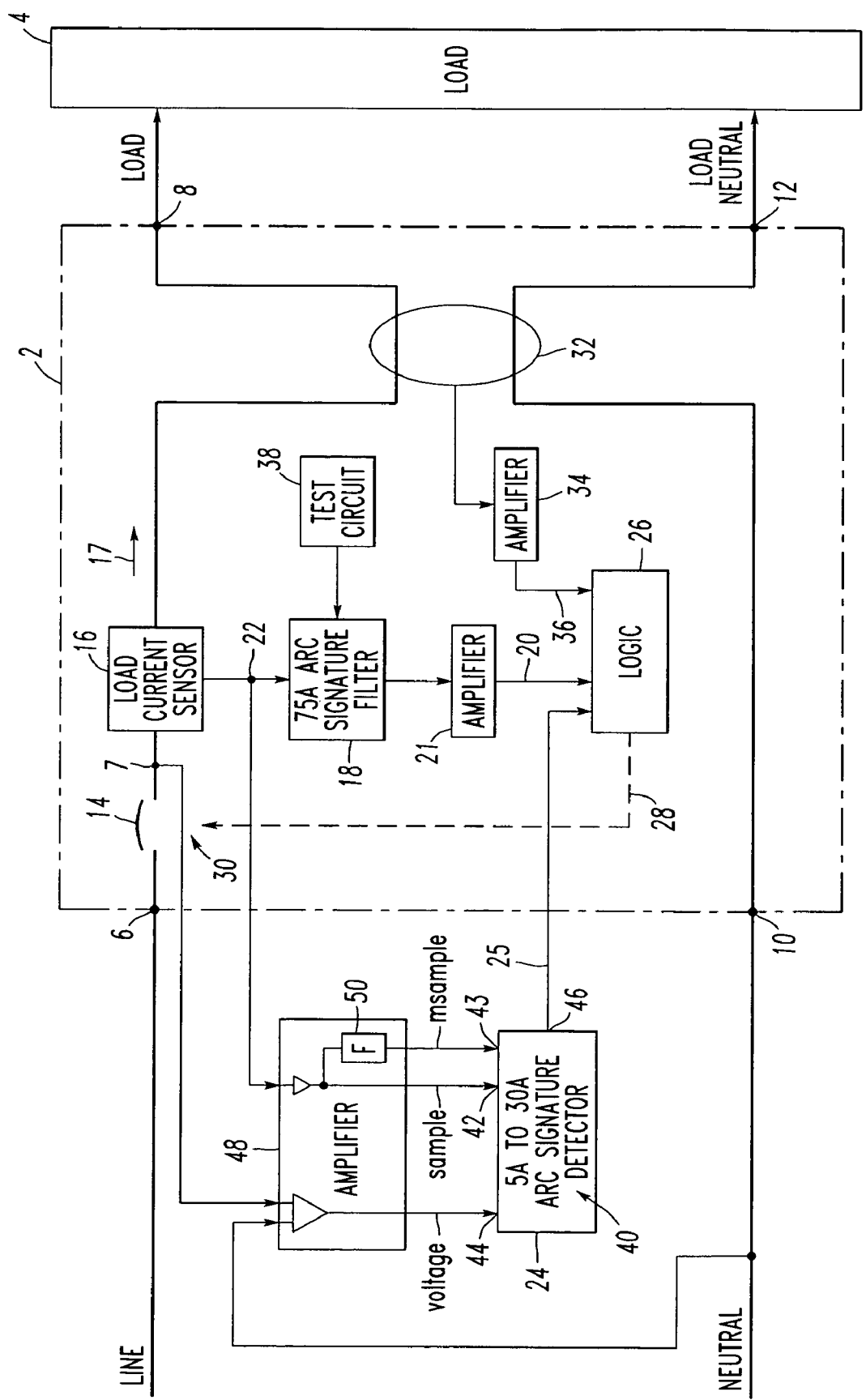
FIG. 1 is a block diagram of a single pole branch/feeder arc fault circuit interrupter in accordance with the present invention.

Referring to FIG. 1, an arc fault circuit interrupter, such as circuit breaker 2, is for an electrical circuit associated with one of a plurality of different types of loads, such as load 4. The circuit breaker 2 includes a line terminal 6 and a load terminal 8. If the circuit breaker is optionally adapted to provide ground fault protection, then it also includes a neutral terminal 10 and a load neutral terminal 12. As is conventional, separable contacts 14 are electrically connected between the line terminal 6 and the load terminal 8. A load current sensor 16 is adapted to sense current 17 flowing between the line and load terminals 6,8 and through the separable contacts 14. Here, the current 17 is associated with one of the different types of loads and includes a plurality of alternating current line cycles. As is also conventional, a first arc fault detection circuit 18 (e.g., a 75 A arc signature filter) is adapted to generate a first trip signal 20 through amplifier 21 responsive to the sensed current 22 from the current sensor 16. Suitable arc fault detection circuits, such as the circuit 18, are disclosed, for example, in U.S. Pat. Nos. 5,224,006; 5,691,869; and 5,818,237, which are hereby incorporated by reference herein.

In accordance with the present invention, a second arc fault detection circuit 24 (e.g., 5 A to 30 A arc signature detector) is adapted to collect a plurality of samples of the sensed current 22 for a current one of the line cycles and a plurality of samples of the sensed current 22 for one of the line cycles prior to the current one of the line cycles, to determine a total current value from a peak current of the samples of the sensed current for the current one of the line cycles, to employ the total current value and some of the samples to determine the one of the types of loads, and to generate a second trip signal 25 responsive to the sensed current 22 and the determined one of the types of loads. A trip circuit 26 is adapted to generate a third trip signal 28 responsive to the first and second trip signals 20,25. An operating mechanism 30 is adapted to open the separable contacts 14 responsive to the third trip signal 28.

Although not required, the circuit breaker 2 may include a ground fault current sensor 32 (e.g., personnel protection; equipment protection; 30 mA) and a corresponding amplifier 34, which generates a ground fault trip signal 36 to the trip circuit 26. As is also not required, the first arc fault detection circuit 18 includes a suitable test circuit 38, which generates the first trip signal 20 in response to a user request.

The second arc fault detection circuit 24 may be, for example, a suitable PIC® model microprocessor (μP) as marketed by Microchip Technology Inc. of Chandler, Ariz., including, for example, internal memory for a suitable firmware routine 40, plural analog inputs, such as 42,43,44, and plural I/O lines, such as output 46. Upstream of the second arc fault detection circuit 24 is a suitable amplifier circuit 48, which buffers the analog sensed current 22 from the load current sensor 16 to the first analog input 42 (sample), which buffers and filters the analog sensed current 22 from the load current sensor 16 to the second analog input 43 (msample), and which buffers the switched line voltage 7 from the load side of the separable contacts 14 to the third analog input 44 (voltage). Preferably, the amplifier circuit 48 includes a filter circuit (F) 50, which is a low pass circuit having a cutoff frequency of about 1 kHz for the second analog input 43.

Figure 2A:
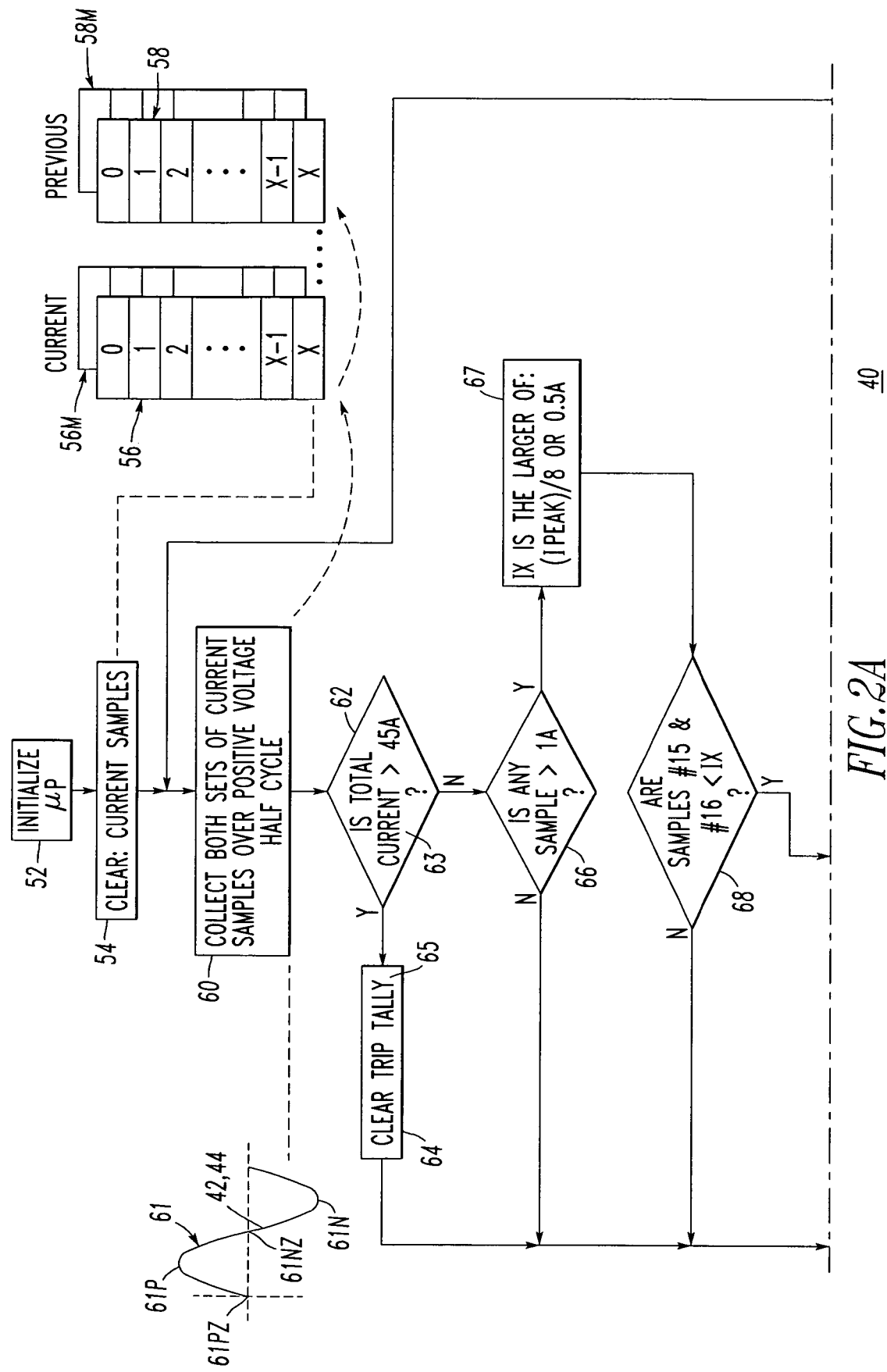
FIGS. 2A-2B form a flowchart of a clearing time algorithm for the processor of FIG. 1 for arc faults resulting from opposing electrodes of a carbonized path arc clearing time test.
Figure 2B:
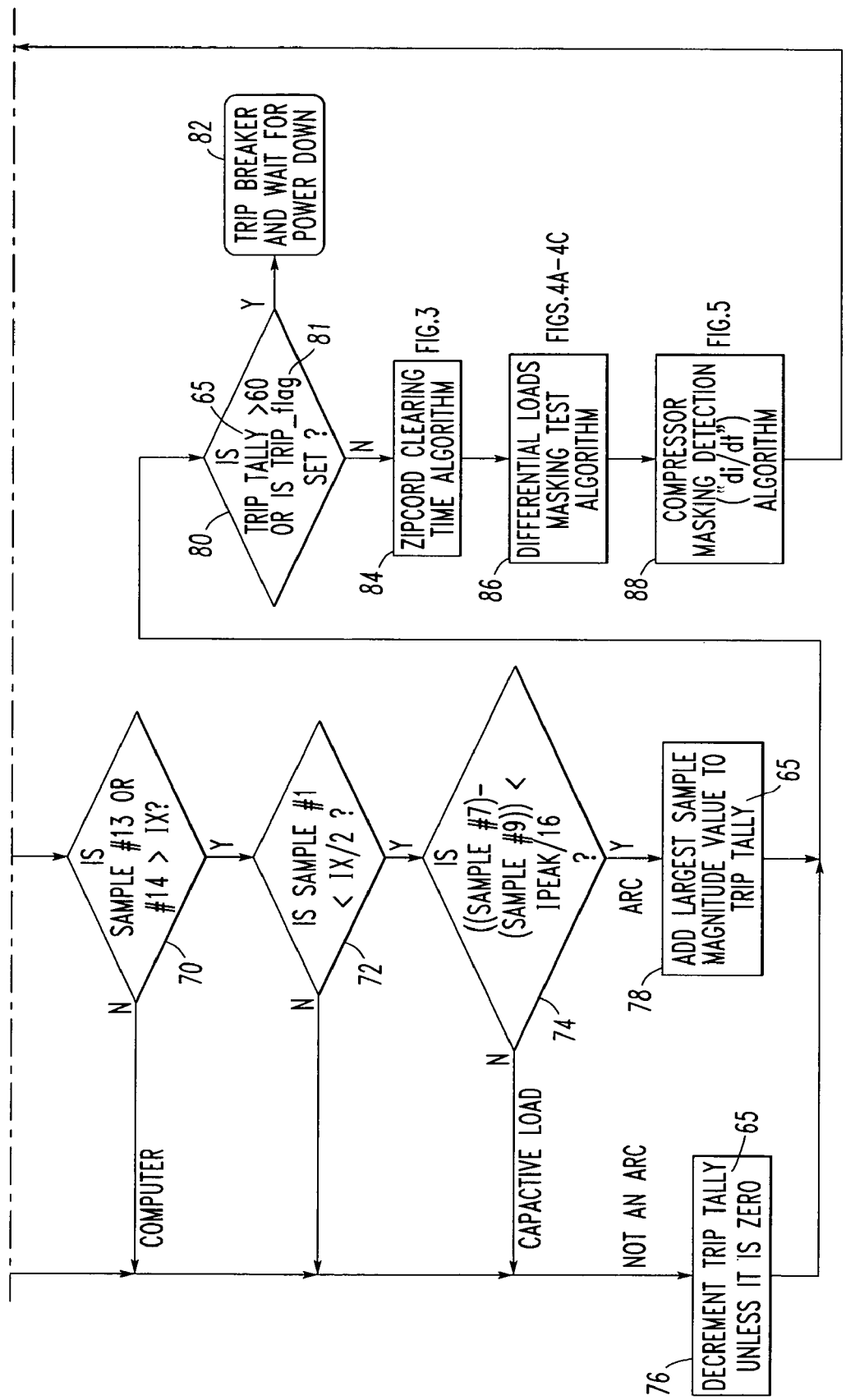

FIGS. 2A-2B show the clearing time algorithm 40 for the processor 24 of FIG. 1. This algorithm 40 is suitable for arc faults resulting from opposing electrodes (not shown) of a carbonized path arc clearing time test. First, at 52, the algorithm 40 initializes the processor 24 of FIG. 1, before it clears, at 54, current sample arrays 56,56m,58,58m. Next, at 60, the algorithm 40 copies the values from the current arrays 56,56m to the previous arrays 58,58m, respectively. Then, the algorithm 40 collects the two current sets of the current samples in the arrays 56 (sample), 56m (msample) from the respective analog inputs 42,43 of FIG. 1. In this example, a count (e.g., x+1) of the samples of the sensed current for a current one of the line cycles is about 19 (e.g., sample #0 (or sample (0)) through and including sample #18 (or sample (18)). The line cycles, such as 61, include a positive half cycle 61P and a negative half cycle 61N. Preferably, the algorithm 40 collects the samples of the sensed current for the current one of the line cycles substantially during the positive half cycle 61P and during the start of the negative half cycle 61N, and processes the samples of the sensed current for the current one of the line cycles, in order to generate the second trip signal 25 (FIG. 1) during the negative half cycle 61N. In this example, the line voltage and the sensed current are in phase, and the algorithm 40 collects about 19 of the samples of the sensed current for the current one of the line cycles at a rate of about 32 samples per line cycle. Alternatively, the sensed current may lead or lag the line voltage. The algorithm 40 collects a first one of the samples (sample #0) of the sensed current at about the positive zero crossing 61PZ of the line cycle of the line voltage, as sensed from analog input 44 (voltage) (FIG. 1). For example, the processor 24 employs an edge-triggered interrupt (not shown) that responds to the positive zero crossing 61PZ.

For example, if N is an integer, such as 8, then the algorithm 40 collects about 2N plus three (=19) of the samples of the sensed current for the current one of the line cycles. The algorithm 40 collects an (N+1)th one (e.g., 9th) (e.g., sample #8) of the samples of the sensed current at about the positive peak of the positive half cycle 61P of the line voltage. The capacitive di/dt is maximum (positive) at the line voltage positive peak, while resistive di/dt is zero. The algorithm collects a (2N+1)th one (e.g. 17th) (e.g., sample #16) of the samples of the sensed current at about the negative zero crossing 61NZ of the line cycle of the line voltage. In this example, two additional samples (e.g., sample #17 and sample #18) are collected during the negative half cycle 61N.

Although the processor 24 of FIG. 1 inputs, converts and stores the values substantially during the positive half cycle 61P plus a relatively small portion of negative half cycle 61N, with subsequent processing in the subsequent portion of negative half cycle 61N, this could be reversed. The processor 24 provides a suitable analog-to-digital conversion (e.g., without limitation, about 7 counts per ampere) of the sensed current values 22 (FIG. 1) to the digital values in the arrays, such as 56.

Next, at 62, the algorithm 40 determines a total current value (Ipeak) 63, which is the peak or maximum current of the first seventeen values of the current array 56. If the total current value is greater than 45 A, then, at 64, a trip tally 65 is cleared, since the current samples in the array 56 do not represent a low level arc. After step 64, execution resumes at 76. Otherwise, if the total current value is less than 45 A, then execution resumes with the test at 66. If any of the tests at even steps 66-74 fail, then, again, the current samples in the array 56 do not represent an arc and execution resumes at 76. However, if all of the tests at even steps 66-74 pass, then the current samples in the array 56 do represent an arc and execution resumes at 78.

At 66, it is determined if any of the first seventeen current samples in the current array 56 are greater than 1 A. If so, then at 67, a value, Ix, is determined to be the larger of Ipeak/8 or 0.5 A. Next, at 68, it is determined if the sixteenth and seventeenth samples in the current array 56 are both less than Ix. If so, then at 70, it is determined if either the fourteenth or the fifteenth samples in the current array 56 are greater than Ix. If not, then the load is a computer; but, if so, then at 72, it is determined if the second sample in the current array 56 is less than one half of Ix. If so, then at 74, it is determined if the eighth sample less the tenth sample in the current array 56 is less than one sixteenth of Ipeak. If not, then there is a capacitive load. On the other hand, since all of even tests 66-74 have passed, then the load is an arc and execution resumes at 78.

If there was no arc, then step 76 decrements the trip tally 65 by one, unless such trip tally was already zero. Hence, the trip tally 65 is greater than or equal to zero. Otherwise, if there was an arc, then, step 78 adds the total current value (Ipeak) 63, which is the peak or maximum current of the first seventeen values of the current array 56, to the trip tally 65.

After either of the steps 76,78, at 80, it is determined if the trip tally 65 is greater than a suitable threshold (e.g., 60) or if a TRIP_flag 81 (FIGS. 4A-4C and 5) was set. If so, then, at 82, the circuit breaker 2 of FIG. 1 is tripped by asserting the second trip signal 25 (FIG. 1), after which the processor 24 awaits power down, since the separable contacts 14 (FIG. 1) and the source of power (not shown) therefrom is to be removed. On the other hand, if the trip tally 65 is not greater than its threshold (e.g., 60) and if the TRIP_flag 81 was not set, then three routines 84 (FIG. 3), 86 (FIGS. 4A-4C) and 88 (FIG. 5) are sequentially executed before execution resumes at 60. Routine 84 provides a zip cord clearing time algorithm. Routine 86 provides a differential loads masking test. Routine 88 provides a compressor masking detection (di/dt) algorithm.

Figure 3:
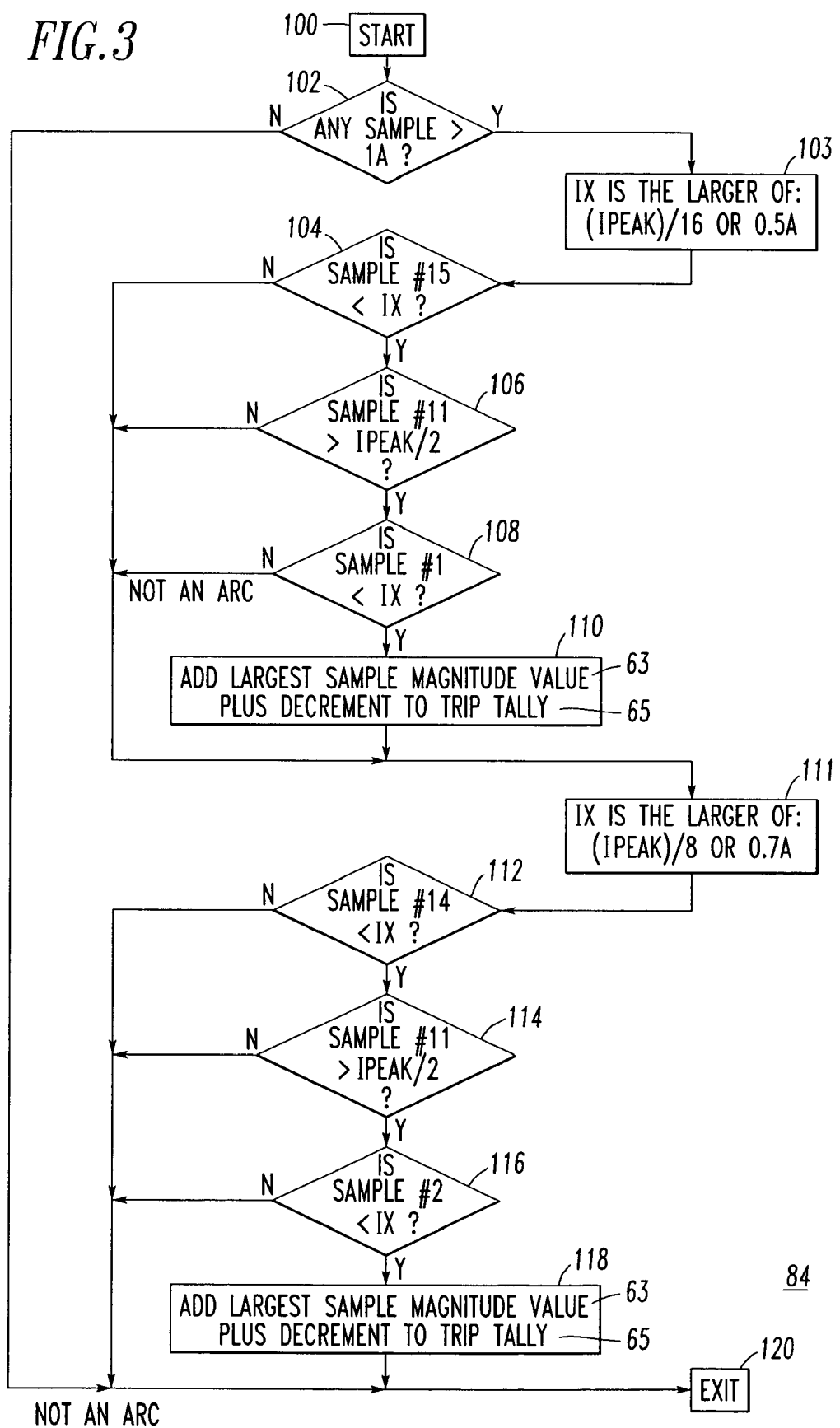
FIG. 3 is a flowchart of a clearing time algorithm for zip cord for the processor of FIG. 1.

FIG. 3 shows the zip cord clearing time algorithm routine 84 of FIG. 2B. After starting at 100, it is determined, at 102, if any of the first seventeen samples in the current array 56 (FIG. 2A) is greater than 1 A. If so, then execution resumes at 103. Otherwise, the load is deemed not to be an arc (from a zip cord) and the routine 84 exits at 120. If any of the even tests 104,106,108 fail, then the load is deemed not to be an arc (from a zip cord) and execution resumes at 111. If any of the even tests 112,114,116 fail, then the load is deemed not to be an arc (from a zip cord) and the routine 84 exits at 120. At 103, a temporary value Ix is set to be the larger of Ipeak/16 or 0.5 A, where Ipeak 63 was determined in FIG. 2A. At 104, it is determined if the sixteenth sample of the current array 56 is less than Ix. If so, then at 106, it is determined if the twelfth sample of the current array 56 is greater than Ipeak/2. If so, then at 108, it is determined if the second sample of the current array 56 is less than Ix. If so, then at 110, the trip tally 65 (FIG. 2A) is increased by the total current value (Ipeak) 63, which is the peak or maximum current of the first seventeen values of the current array 56, plus one (e.g., the decrement value of step 76 of FIG. 2B).

After 110, at 111, another temporary value Ix is set to be the larger of Ipeak/8 or 0.7 A, where Ipeak 63 was determined in FIG. 2A. At 112, it is determined if the fifteenth sample is less than Ix. If so, then at 114, it is determined if the twelfth sample is greater than Ipeak/2. If so, then at 116, it is determined if the third sample is less than Ix. If so, then at 118, the trip tally 65 (FIG. 2A) is increased by the total current value (Ipeak) 63, which is the peak or maximum current of the first seventeen values of the current array 56, plus one (e.g., the decrement value of step 76 of FIG. 2B). Finally, after step 118, the routine 84 exits at 120.

Figure 4B:
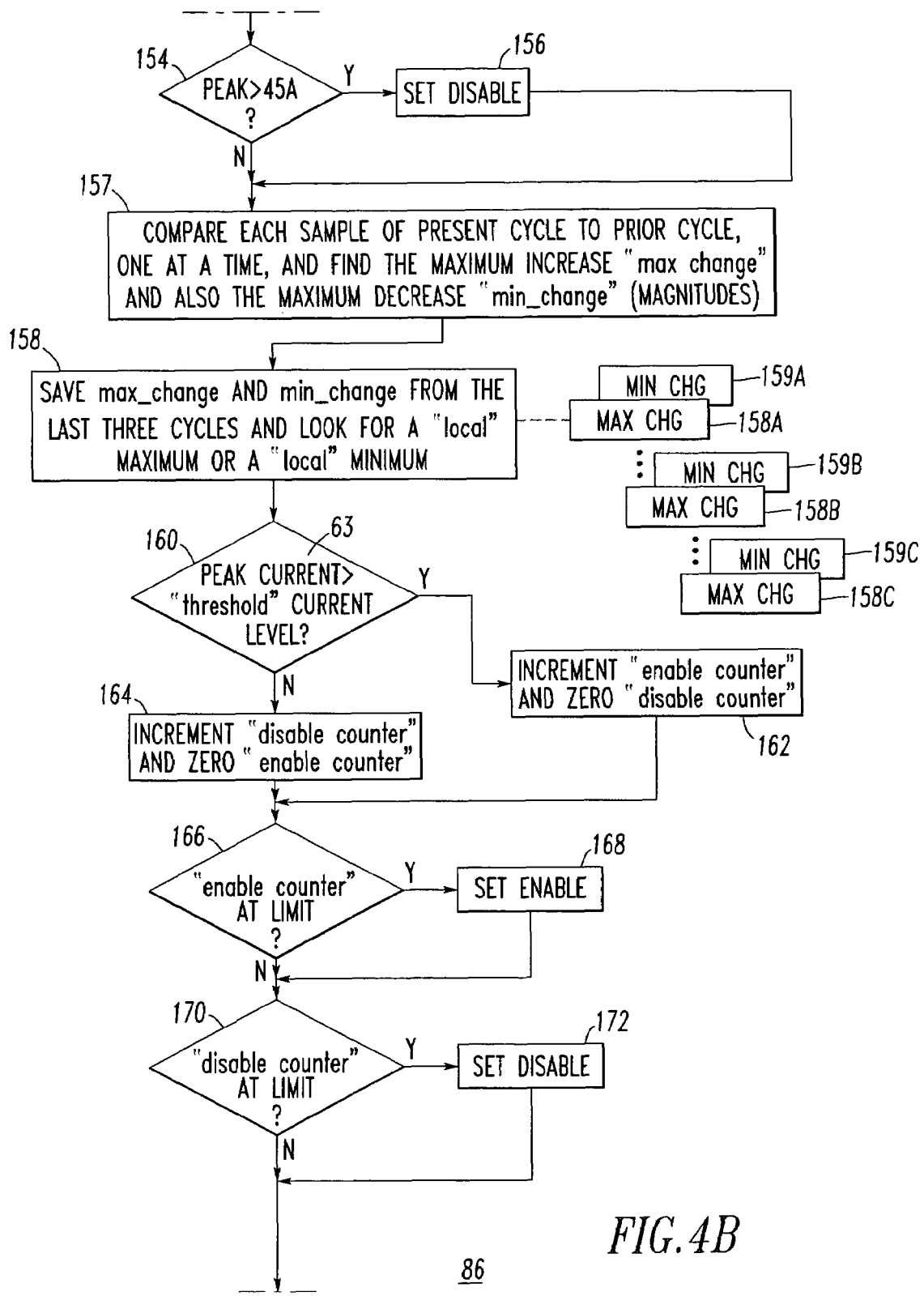
Figure 4C:
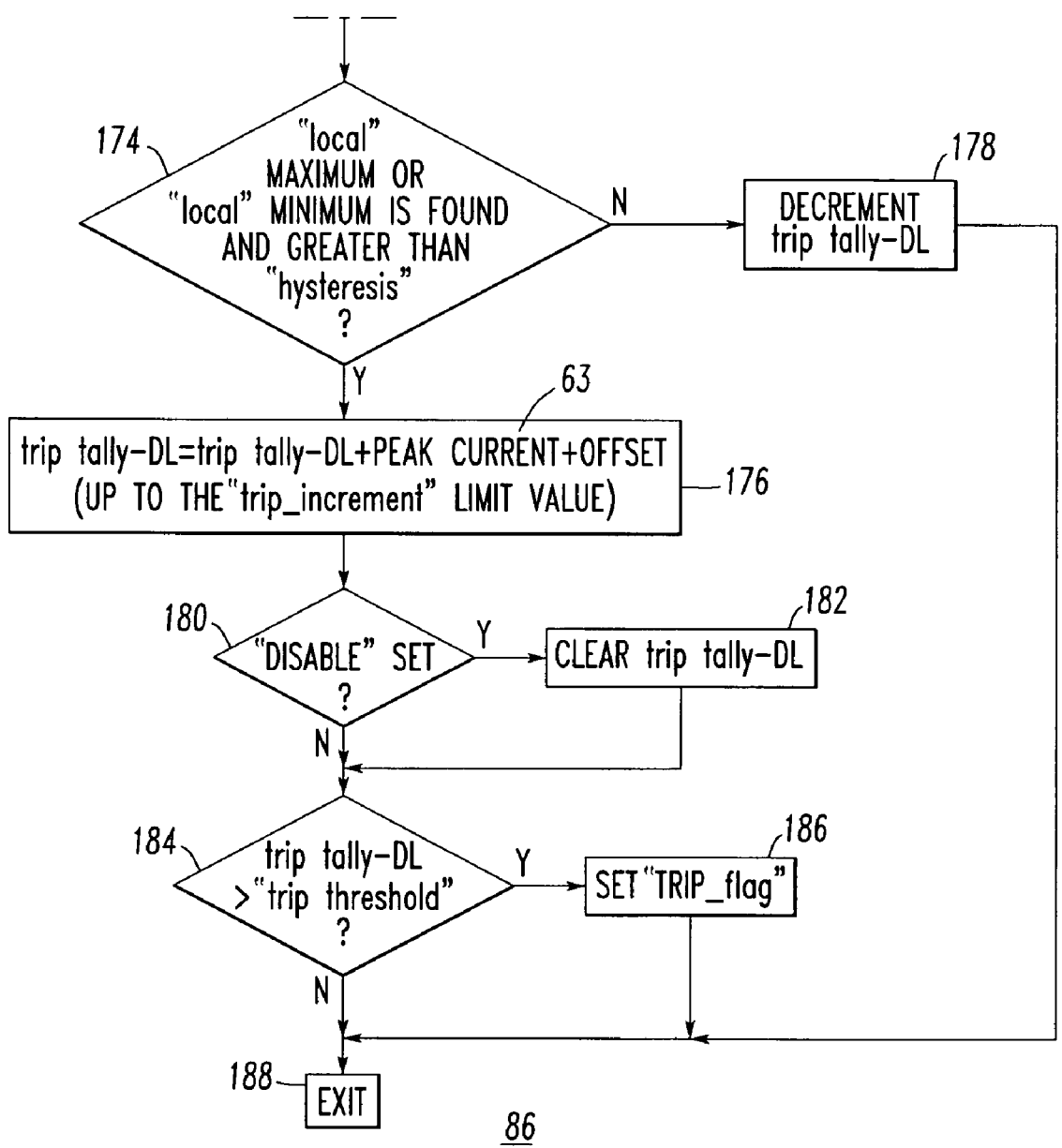
Figure 6:
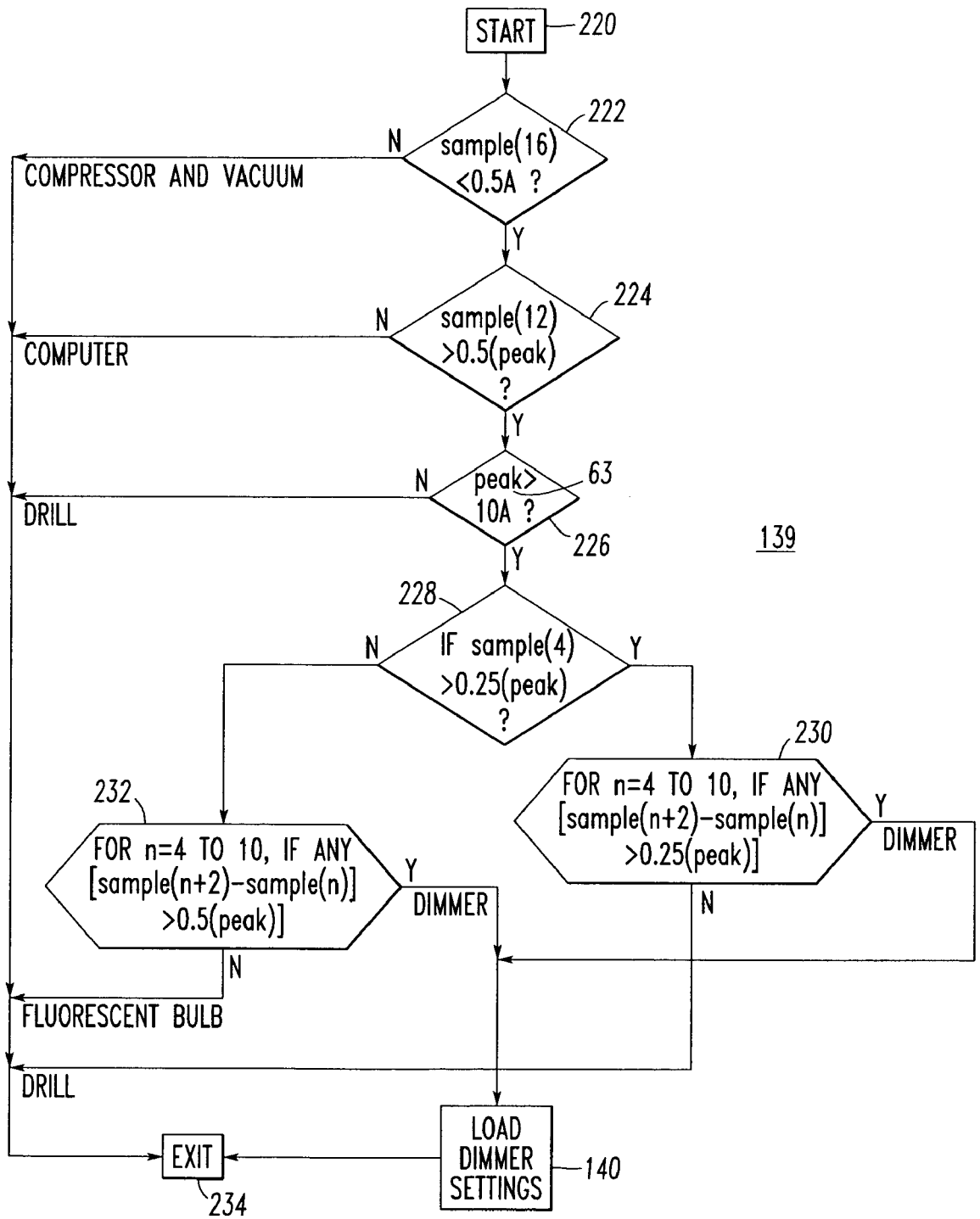
FIG. 6 is a flowchart of a dimmer detection algorithm for the algorithm of FIGS. 4A-4C.

FIGS. 4A-4C show the differential loads masking test routine 86 of FIG. 2B. Unless suitable settings are provided, non-arcing loads may mask an arc fault. After starting at 130, the routine 86 determines whether the load is one of a computer, a dimmer, a vacuum cleaner, a fluorescent light or a compressor. First, at 132, default values of "hysteresis" (e.g., 6.0 A) and "offset" (e.g., 0 A) are initialized. Next, at 134, it is determined if the load is a computer by checking if the twelfth sample (e.g., sample (11)) in the current (unfiltered) array 56 (FIG. 2A) is less than Ipeak/2 and if Ipeak is greater than 12 A. If so, then at 136, "hysteresis" is set to 0.5 A and execution resumes at 138. On the other hand, if the test failed at 134, then at 138, it is determined if the load is a dimmer by employing the dimmer detection algorithm 139 (FIG. 6). If so, then at 140, "hysteresis" is set to 0.25 A, "offset" is set to a maximum value (e.g., about one half of the rated trip current) and execution resumes at 142. On the other hand, if the test failed at 138, then at 142, it is determined if the load is a vacuum cleaner by checking if the seventeenth sample in the current (unfiltered) array 56 is greater than 0.5 A, if the fifth sample in the current (filtered) array 56*m* (FIG. 2A) is greater than Ipeak/8, and if Ipeak is greater than 12 A. If so, then at 144, "hysteresis" is set to 0.25 A and execution resumes at 146. On the other hand, if the test failed at 142, then at 146, it is determined if the load is a fluorescent light by checking if the fifth sample in the current (filtered) array 56*m* is greater than Ipeak/2 and if Ipeak is greater than 3 A. If so, then at 148, "hysteresis" is set to 0.25 A, "offset" is set to the maximum value (e.g., about one half of the rated trip current) and execution resumes at 150. On the other hand, if the test failed at 146, then at 150, it is determined if the load is a compressor by checking if the seventeenth sample in the current (filtered) array 56*m* is greater than Ipeak/4 or 4 A, and if Ipeak is greater than 12 A. If so, then at 152, "hysteresis" is set to 3.0 A and execution resumes at 154 (FIG. 4B). In this hierarchy, a compressor, for example, overrides any prior settings of the hysteresis. On the other hand, if the test failed at 150, then at 154, it is determined if Ipeak is greater than 45 A. If not, then execution resumes at 157. Otherwise, at 156, a flag is set to a DISABLE state before step 157 is executed.

Step 157 subtracts from each sample of the present cycle in the current (unfiltered) array 56 (FIG. 2A), one at a time, each sample of the previous cycle in the previous (unfiltered) array 58 (FIG. 2A). From these subtractions, a maximum (absolute value) increase ("max_change") value and a maximum (absolute value) decrease ("min_change") value are determined for each cycle. For example, for normal, repetitive sine waves, the "max_change" value and, the "min_change" value are both about zero. As a simple example, if all of the corresponding values of the arrays 56,58 are identical except for four samples, with sample seven of the array 56 being 50, sample seven of the array 58 being 55, sample eleven of the array 56 being 30, and sample eleven of the array 58 being 26, then the change values are all zero, except for the change value of the seventh samples being 5(=55–50) and the change value of the eleventh samples being –4(=26–30). Hence, in this example, the "max_change" value is 5 and the "min_change" value is 4, which is the absolute value of –4.

Step 158 saves the "max_change" value (MAX CHG 158A) and the "min_change" value (MIN CHG 159A) for the present cycle. Similarly, that step has also saved the values 158B,159B and 158C,159C, which are based on samples from the past three cycles, for the past two cycles. Step 158 also determines if there is a local maximum in the saved values 158A,158B,158C or a local minimum in the saved values 159A,159B,159C. The value of the local minimum or the local maximum is the smallest amount that a saved value (e.g., 158B; 159B) is greater than its neighbors on either side (e.g., 158A,158C; 159A,159C). If the saved value is not greater than both of its neighbors on either side, then the value of the local minimum or local maximum is zero. For example, if the three values of interest from 158A,158B,158C were 10, 15 and 10, then 5(=15–10) is the local maximum. As another example, if the three values of interest were 5, 10 and 15, then there is no local maximum (since the values are increasing) and the value of the local maximum is zero. As another example, if the three values of interest from 159A,159B,159C were 5, 10 and 5, then 5(=10–5) is the local minimum.

Next, at 160, it is determined if Ipeak 63 is greater than a "threshold" current value (e.g., without limitation, 1.0 A). If so, then at 162, an "enable counter" is incremented and a "disable counter" is zeroed. Otherwise, if Ipeak 63 was less than or equal to the "threshold" current value, then at 164, the "disable counter" is incremented and the "enable counter" is zeroed. Next, at 166, it is determined if the enable counter is at its limit (e.g., without limitation, about 1.5 s). If so, then at 168, the flag of step 156 is set to the ENABLE state. On the other hand, if the enable counter is not at its limit, or after 168, it is determined, at 170, if the disable counter is at its limit (e.g., without limitation, about 0.5 s). If so, then at 172, the flag of step 156 is set to the DISABLE state. On the other hand, if the disable counter is not at its limit, or after 172, step 174 is executed.

At 174 (FIG. 4C), if a local maximum or a local minimum was found at 158, then if either or both of those values are greater than the "hysteresis" value, as was determined by even steps 132-152 (FIG. 4A), then at 176, a differential loads trip tally value ("trip tally-DL") is increased by the value of Ipeak 63 plus the value of "offset" from one of steps 132,140,148, but that sum is limited by the "trip_increment" limit value (e.g., without limitation, a suitable constant; 331). On the other hand, if the test at 174 failed, then at 178, the differential loads trip tally value ("trip tally-DL") is decremented before the routine 86 exits at 188. Note that this operation must occur twice if both a local maximum and a local minimum are observed.

After 176, at 180, if the flag of step 156 is set to the DISABLE state, then the differential loads trip tally value ("trip tally-DL") is cleared at 182. Otherwise, or after 182, at 184, it is determined if the differential loads trip tally value ("trip tally-DL") is greater than the "trip threshold" value (e.g., without limitation, a suitable constant; 827). If so, then the TRIP_flag 81 of step 80 of FIG. 2B is set at 186. Otherwise, or after 186, the routine 86 exits at 188.

Figure 5:
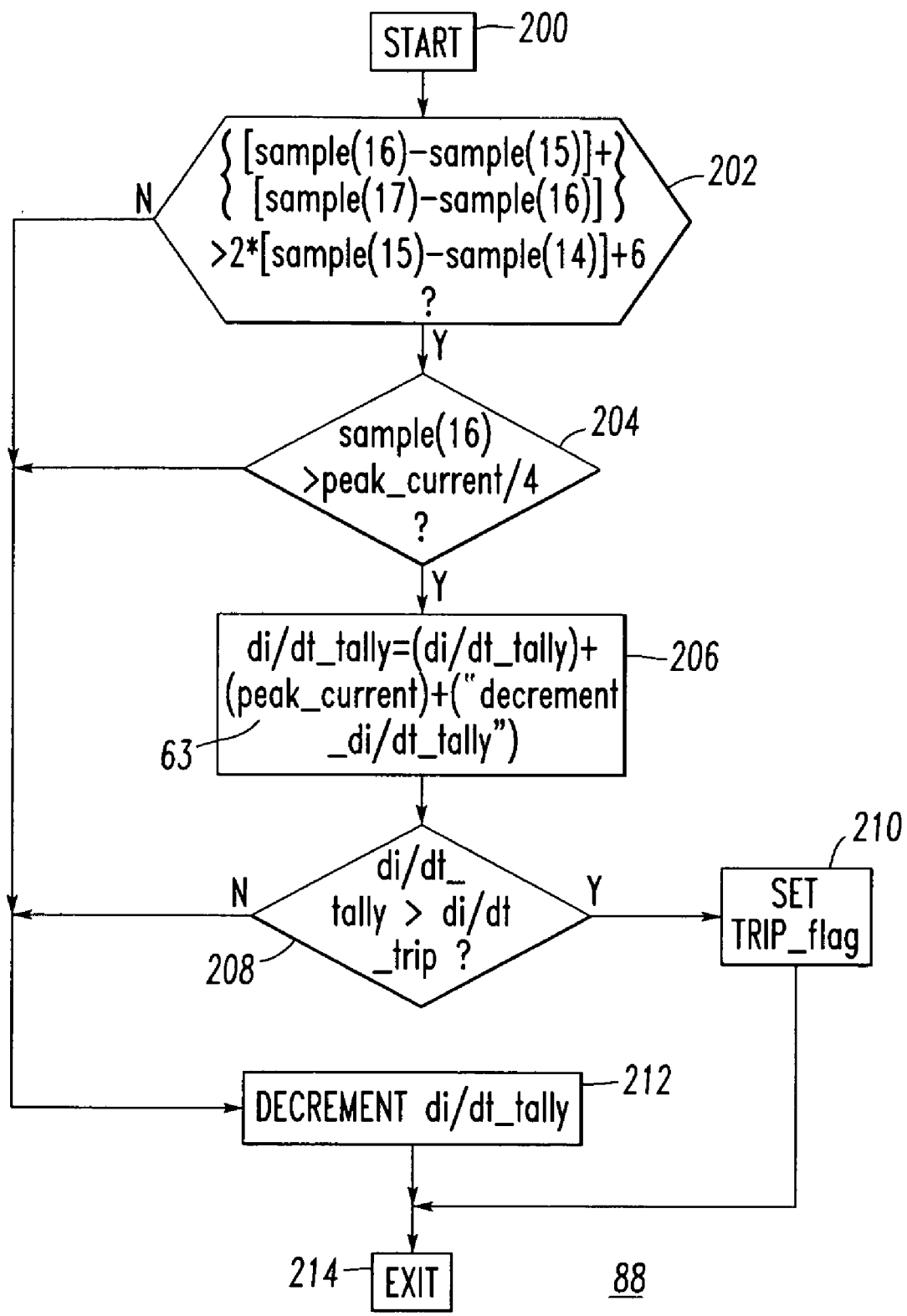
FIG. 5 is a flowchart of a compressor masking detection (di/dt) algorithm for the processor of FIG. 1.

FIG. 5 shows the compressor masking detection (di/dt) algorithm routine 88 of FIG. 2B. After the routine 88 starts at 200, it is determined, at 202, whether (a) the seventeenth sample (i.e., sample (16)) of the current array 56 of FIG. 2A less the sixteenth sample plus the eighteenth sample less the seventeenth sample is greater than (b) six plus two times the difference between the sixteenth sample less the fifteenth sample. If so, then at 204, it is determined if the seventeenth sample is greater than Ipeak/4. If so, then at 206, the di/dt_tally is increased by Ipeak 63 (FIG. 2A) plus "decrement_di/dt_tally" (e.g., one). Next, at 208, it is determined if the di/dt_tally is greater than the di/dt_trip (e.g., without limitation, a suitable constant; 827). If so, then at 210, the flag TRIP_flag 81 of step 80 of FIG. 2B is set. Finally, after 210, the routine 88 exits at 214. If any of the tests at 202, 204 or 208 fail, then, at 212, di/dt_tally is decremented before the routine 88 exits at 214.

FIG. 6 shows the dimmer detection algorithm routine 139 of FIG. 4A. After starting at 220, it is determined at 222 if the seventeenth sample (i.e., sample (16)) of the current array 56 of FIG. 2A is less than 0.5 A. If not, then the load may be one of a compressor or a vacuum cleaner, and the routine 139 exits at 234. If so, then at 224, it is determined if the thirteenth sample is greater than half of the (peak) current. If not, then the load may be a computer, and the routine 139 exits at 234. If so, then at 226, it is determined if Ipeak 63 is greater than 10 A. If not, then the load may be a drill, and the routine 139 exits at 234. If so, then at 228, it is determined if the fifth sample is greater than one fourth of the (peak) current. If so, then 230 is executed; otherwise, step 232 is executed.

Step 230 looks at the fifth through the eleventh samples of the current array 56 of FIG. 2A. For each of those samples, it is determined if the difference between (a) a second one of those samples after the corresponding one of the fifth one of the samples through and including the eleventh one of the samples and (b) the corresponding one of the fifth one of the samples through and including the eleventh one of the samples, is greater than 0.25 (peak). For example, if sample (6)–sample (4) is greater than 0.25 (peak) and/or if sample (12)–sample (10) is greater than 0.25 (peak), then the test passes, the load is a dimmer and the routine loads the dimmer settings at 140 of FIG. 4A and exits at 234. If not, then the load may be a drill and the routine exits at 234. Step 232 is very similar to step 230, except that the value being compared is 0.5 (peak) rather than 0.25 (peak). If the test at 232 passes, then load is a dimmer and the routine loads the dimmer settings at 140 of FIG. 4A and exits at 234. If not, then the load may be a fluorescent bulb and the routine exits at 234. The exit 234 returns to step 142 of FIG. 4A.

Figure 7:
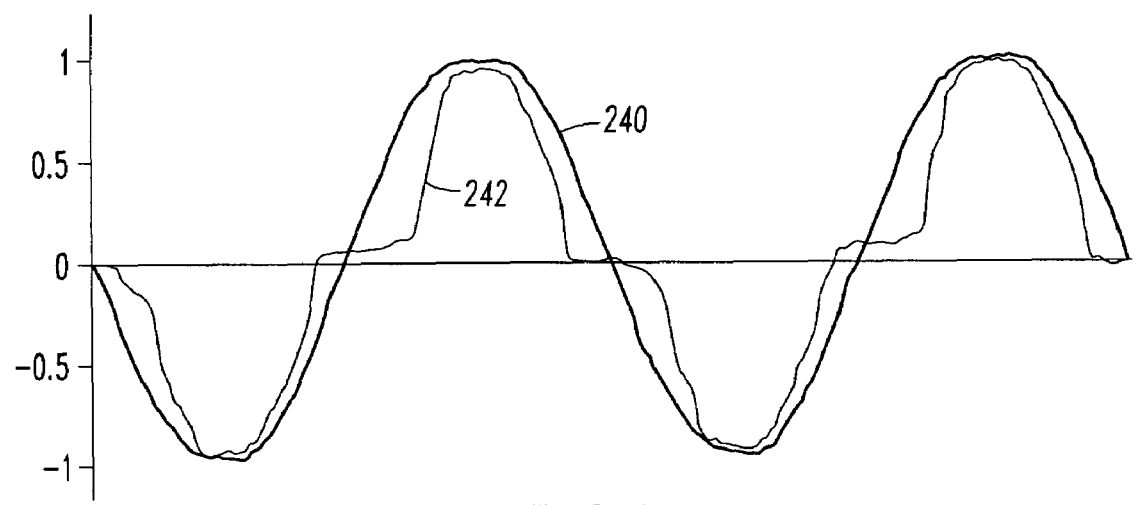
FIG. 7 is a plot of alternating current voltage and current for a carbon arc.

FIG. 7 is a plot of alternating current voltage 240 (e.g., switched line voltage 7 of FIG. 1) and current 242 (e.g., analog sensed current 22 of FIG. 1) for a carbon arc (not shown).

Figure 8:
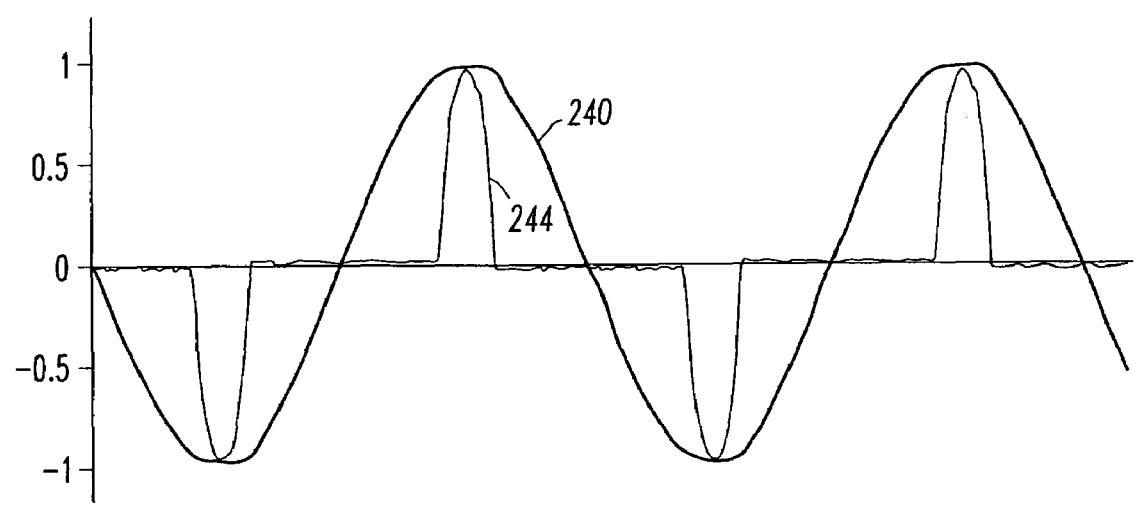
FIG. 8 is a plot of alternating current voltage and current for a computer load, such as an electronic switching mode power supply.

FIG. 8 is a plot of the alternating current voltage 240 of FIG. 7 and current 244 (e.g., analog sensed current 22 of FIG. 1) for a computer load, such as an electronic switching mode power supply (not shown).

Figure 9:
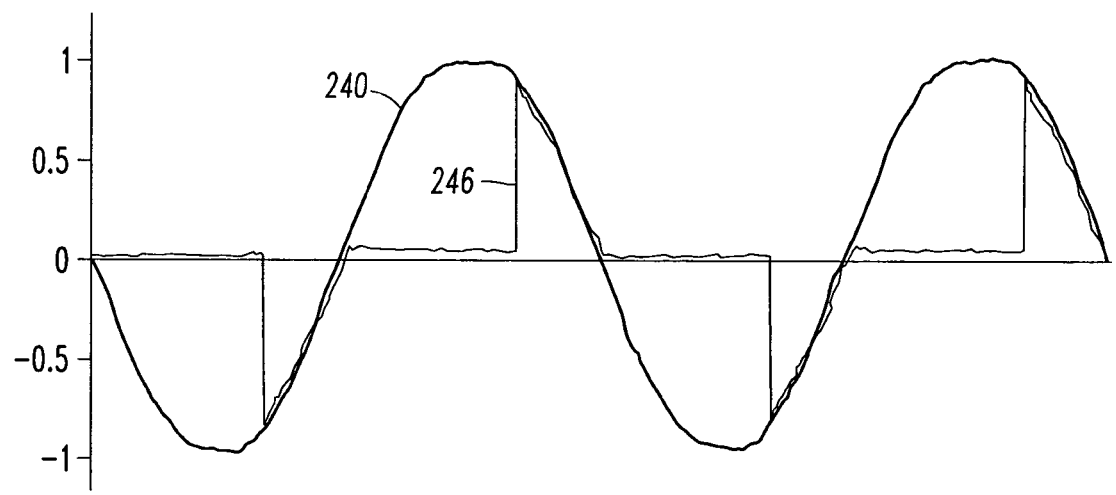
FIG. 9 is a plot of alternating current voltage and current for an electronic lamp dimmer at about 120 degrees.

FIG. 9 is a plot of the alternating current voltage 240 of FIG. 7 and current 246 (e.g., analog sensed current 22 of FIG. 1) for an electronic lamp dimmer (not shown), which is set at about 120 degrees.

Figure 10:
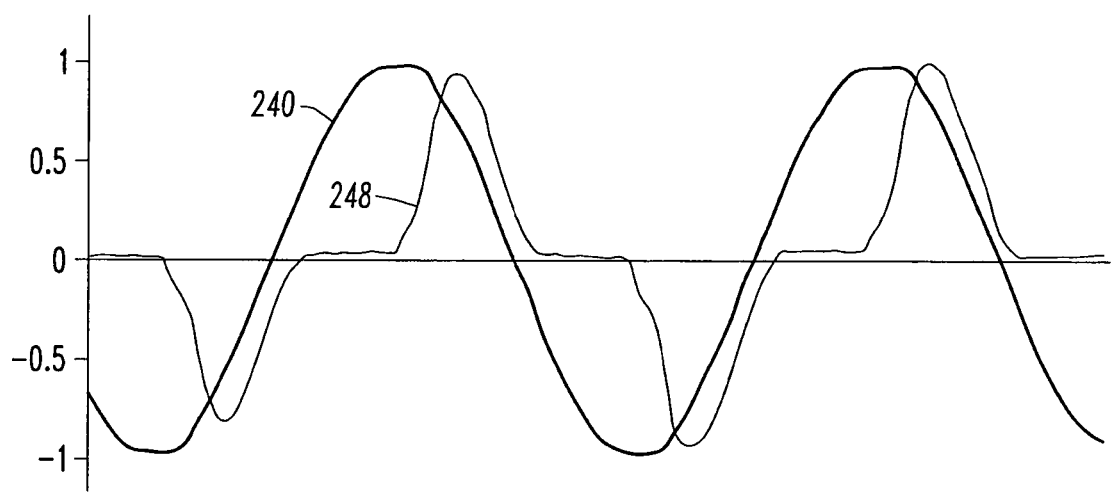
FIG. 10 is a plot of alternating current voltage and current for a drill.

FIG. 10 is a plot of the alternating current voltage 240 of FIG. 7 and current 248 (e.g., analog sensed current 22 of FIG. 1) for a drill (not shown).

Figure 11:
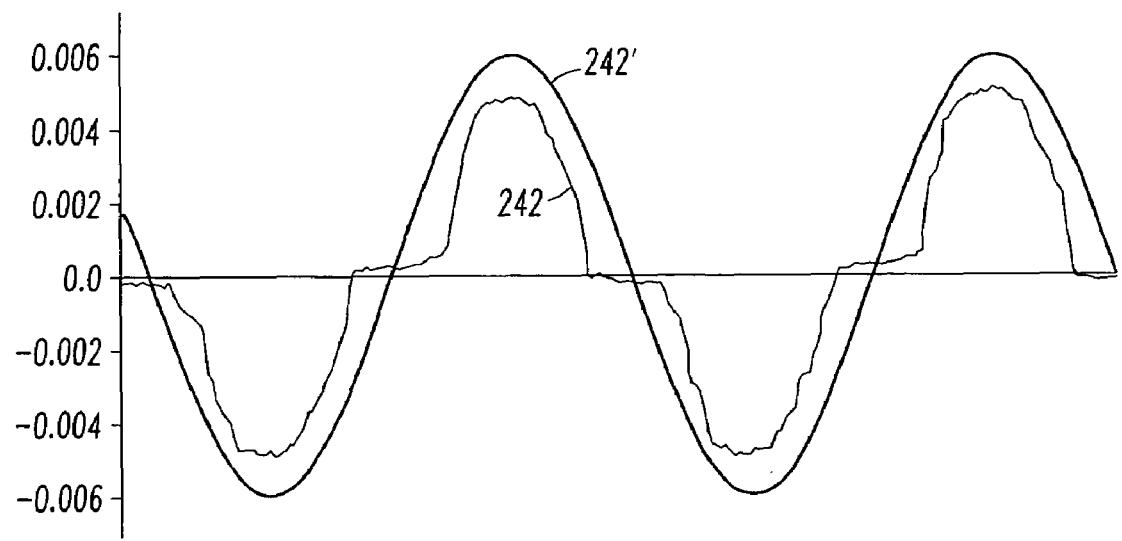
FIG. 11 is a plot of alternating current with and without an arc fault.

FIG. 11 is a plot of the alternating current 242 of FIG. 7 with the arc fault, and normal alternating current 242' without such arc fault.

Figure 12:
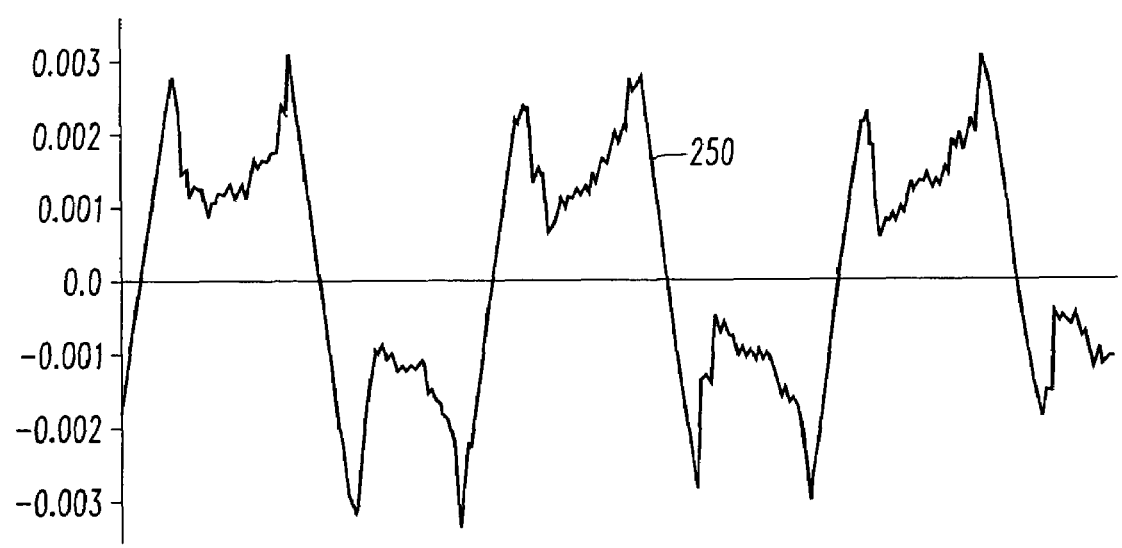
FIG. 12 is a plot of alternating arc voltage resulting from the arc fault of FIG. 11.

FIG. 12 is a plot of alternating arc voltage 250 for the arc fault of FIG. 11.

Figure 13:
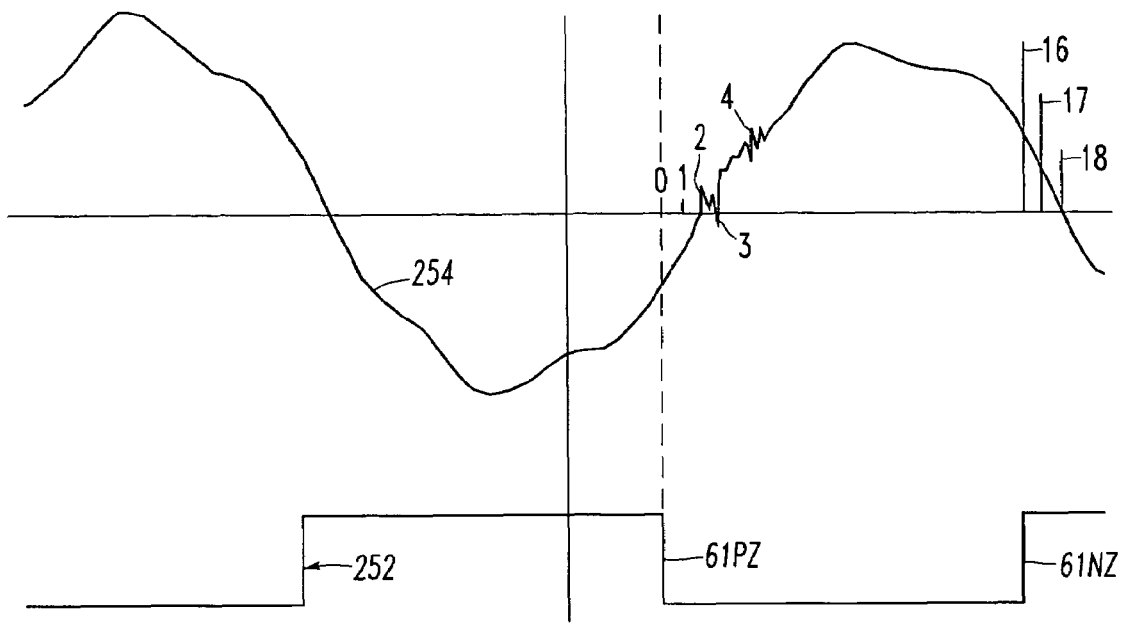
FIG. 13 is a plot of alternating current voltage zero crossings and current for a capacitor start (air compressor type) motor.

FIG. 13 is a plot of alternating current voltage zero crossings 252 and current 254 (e.g., analog sensed current 22 of FIG. 1) for a capacitor start (air compressor type) motor (not shown). The alternating current voltage zero crossings 252, which are shown as an inverted digital signal, include the positive zero crossing 61PZ and negative zero crossing 61NZ of FIG. 2A. For convenience of reference, the approximate sample times of the samples: sample (0), sample (1), sample (2), sample (3), sample (4), sample (16), sample (17), and sample (18), are shown.

Figure 14:
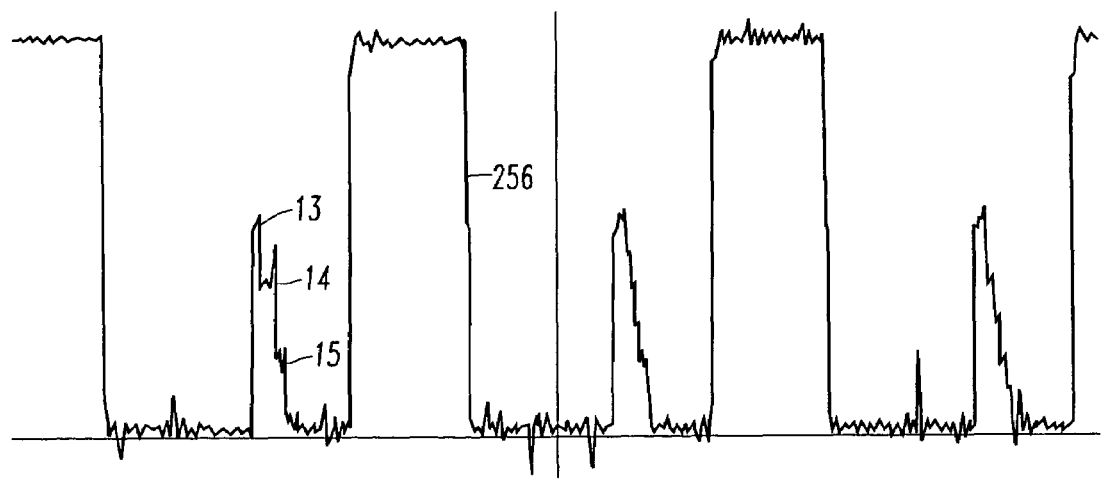
FIG. 14 is a plot of current for a fluorescent lamp.

FIG. 14 is a plot of the current 256 (e.g., analog sensed current 22 of FIG. 1) for a fluorescent lamp (not shown). For convenience of reference, the approximate sample times of the samples: sample (13), sample (14) and sample (15), are shown.

Figure 15:
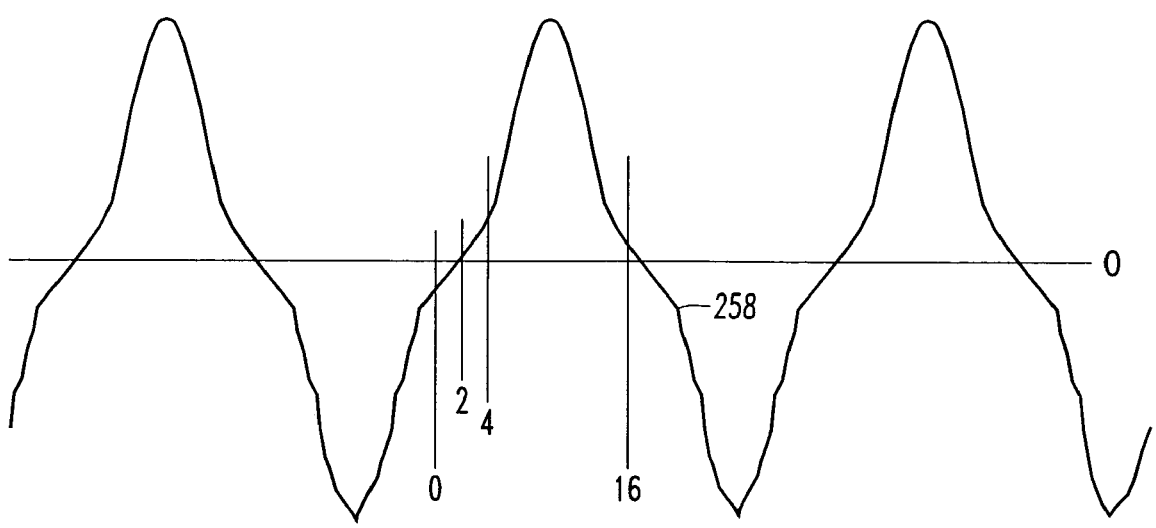
FIG. 15 is a plot of current for a vacuum cleaner.

FIG. 15 is a plot of the current 258 (e.g., analog sensed current 22 of FIG. 1) for a vacuum cleaner (not shown). For convenience of reference, the approximate sample times of the samples: sample (0), sample (2), sample (4) and sample (16), are shown.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter for an electrical circuit associated with one of a plurality of different types of loads, said arc fault circuit interrupter comprising:
   a line terminal;
   a load terminal;
   separable contacts electrically connected between said line terminal and said load terminal;
   a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit includes a trip tally value; and wherein said second arc fault detection circuit clears said trip tally value when said peak current is greater than a first predetermined value; and wherein said line cycles correspond to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; wherein a current value is the larger of a fraction of said peak current and a second predetermined value; wherein said second arc fault detection circuit decrements said nip tally value when: (a) all of said samples of said sensed current for the current one of said line cycles are less than or equal to a third predetermined value; (b) the sixteenth or the seventeenth samples of said sensed current for the current one of said line cycles are greater than or equal to said current value; (c) the fourteenth or the fifteenth samples of said sensed current for the current one of said line cycles are less than or equal to said current value; (d) the second sample of said sensed current for the current one of said line cycles is greater than or equal to a fraction of said current value; or (e) the difference of the eighth sample less the tenth sample of said sensed current for the current one of said line cycles is greater than or equal to a fraction of said current value.

2. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit includes a trip tally value; and wherein said second arc fault detection circuit clears said trip tally value when said peak current is greater than a first predetermined value; and wherein said current one of said line cycles corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; wherein a current value is the larger of a fraction of said peak current and a second predetermined value; wherein said second arc fault detection circuit increases said trip tally value by the largest one of said samples of said sensed current for the current one of said line cycles when: (a) any of said samples of said sensed current for the current one of said line cycles is greater than a third predetermined value; (b) the sixteenth or the seventeenth samples of said sensed current for the current one of said line cycles are less than said current value; (c) the fourteenth or the fifteenth samples of said sensed current for the current one of said line cycles are greater than said current value; (d) the second sample of said sensed current for the current one of said line cycles is less than a fraction of said current value; and (e) the difference of the eighth sample less the tenth sample of said sensed current for the current one of said line cycles is less than a fraction of said current value.

3. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit includes a trip tally value; and wherein said second arc fault detection circuit clears said trip tally value when said peak current is greater than a first predetermined value; and wherein said current one of said line cycles corresponds to a line voltage having a line cycle with a positive zero crossing and a negative zero crossing; wherein said second arc fault detection circuit collects one of said samples of said sensed current at about the positive zero crossing of the line cycle of said line voltage and another one of said samples of said sensed current at about the negative zero crossing of the line cycle of said line voltage; and wherein said second arc fault detection circuit determines whether there is an arc and responsively increases said trip tally value by the largest one of said samples of said sensed current for the current one of said line cycles and, otherwise, decrements said trip tally.

4. The arc fault circuit interrupter of claim 3 wherein said second arc fault detection circuit generates said second trip signal when said trip tally is greater than a second predetermined value.

5. An arc fault circuit interrupter for an electrical circuit associated with one of a plurality of different types of loads, said arc fault circuit interrupter comprising:

a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit includes a trip tally value; and wherein said second arc fault detection circuit clears said trip tally value when said peak current is greater than a first predetermined value; and wherein said current one of said line cycles corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; wherein a current value is the larger of a fraction of said peak current and a second predetermined value; wherein said second arc fault detection circuit increases said trip tally value by the largest one of said samples of said sensed current for the current one of said line cycles when: (a) any of said samples of said sensed current for the current one of said line cycles is greater than a third predetermined value; (b) the sixteenth sample of said sensed current for the current one of said line cycles is less than said current value; (c) the twelfth sample of said sensed current for the current one of said line cycles is greater than a fraction of the largest one of said samples of said sensed current for the current one of said line cycles; and (d) the second sample of said sensed current for the current one of said line cycles is less than said current value.

6. An arc fault circuit interrupter for an electrical circuit associated with one of a plurality of different types of loads, said arc fault circuit interrupter comprising:

a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit includes a trip tally value; and wherein said second arc fault detection circuit clears said trip tally value when said peak current is greater than a first predetermined value; and wherein said current one of said line cycles corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; wherein a current value is the larger of a fraction of said peak current and a second predetermined value; wherein said second arc fault detection circuit increases said trip tally value by the largest one of said samples of said sensed current for the current one of said line cycles when: (a) any of said samples of said sensed current for the current one of said line cycles is greater than a third predetermined value; (b) the fifteenth sample of said sensed current for the current one of said line cycles is less than said current value; (c) the twelfth sample of said sensed current for the current one of said line cycles is greater than a fraction of the largest one of said samples of said sensed current for the current one of said line cycles; and (d) the third sample of said sensed current for the current one of said line cycles is less than said current value.

7. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal; and wherein said line cycle corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; wherein said second arc fault detection circuit collects and saves said samples of said sensed current for four consecutive ones of said line cycles; wherein for three consecutive ones of said line cycles said second arc fault detection circuit determines differences between each of the samples of one of the line cycles and each of the samples of an immediately previous one of the line cycles and determines a maximum positive value and a maximum negative value from said differences for said three consecutive ones of said line cycles; wherein said second arc fault detection circuit determines whether there is one or both of a local maximum value and a local minimum value from said determined maximum positive value and said determined maximum negative value over said three consecutive ones of said line cycles; wherein said second arc fault detection circuit determines a hysteresis value based upon said one or both of said local maximum value and said local minimum value for the current one of said line cycles; and wherein said second arc fault detection circuit determines if said local maximum value or said local minimum value is greater than said hysteresis value and responsively adds said total current value to a trip tally.

8. The arc fault circuit interrupter of claim 7 wherein said second arc fault detection circuit employs a predetermined value for said hysteresis value.

9. The arc fault circuit interrupter of claim 7 wherein said second arc fault detection circuit is adapted to clear said trip tally when said total current value is greater than a predetermined value.

10. The arc fault circuit interrupter of claim 7 wherein said second arc fault detection circuit includes an enable counter and a disable counter; and wherein when said total current value is greater than a first predetermined value said enable counter is incremented and said disable counter is zeroed.

11. The arc fault circuit interrupter of claim 10 wherein said second arc fault detection circuit further includes a flag having an enable state and a disable state; wherein said enable counter includes a first limit; wherein said disable counter includes a second limit; wherein said flag is set to said enable state when said enable counter exceeds said first limit; and wherein said flag is set to said disable state when said disable counter exceeds said second limit.

12. The arc fault circuit interrupter of claim 11 wherein when said second arc fault detection circuit determines if said maximum value or said minimum value is greater than said hysteresis value and responsively adds said total current value to a trip tally, and when said flag has said disable state, said trip tally is cleared, and, alternatively, when said flag has said enable state, and when said trip tally is greater than a second predetermined value, said second trip signal is generated.

13. An arc fault circuit interrupter for an electrical circuit associated with one of a plurality of different types of loads, said arc fault circuit interrupter comprising:
   a line terminal;
   a load terminal;
   separable contacts electrically connected between said line terminal and said load terminal;
   a current sensor adapted to sense current flowing between said line terminal and said load terminal and through said separable contacts, said current associated with one of said types of loads, said sensed current including a plurality of line cycles;
   a first arc fault detection circuit adapted to generate a first trip signal responsive to said sensed current from said current sensor;
   a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
   a trip circuit adapted to generate a third trip signal responsive to said first trip signal or said second trip signal;
   an operating mechanism adapted to open said separable contacts responsive to said third trip signal;
   wherein said second arc fault detection circuit compares at least one of said samples of said sensed current for the current one of said line cycles to a predetermined fraction of said total current value and compares said total current value to a predetermined value, in order to determine said one of said types of loads; and
   wherein said second arc fault detection circuit collects about 19 of said samples of said sensed current for the current one of said line cycles at a rate of about 32 samples per line cycle; wherein a twelfth sample of said sensed current for the current one of said line cycles is less than about half of said total current value; and wherein said second arc fault detection circuit responsively determines that said determined one of said types of loads is a computer.

14. An arc fault circuit interrupter for an electrical circuit associated with one of a plurality of different types of loads, said arc fault circuit interrupter comprising:
   a line terminal;
   a load terminal;
   separable contacts electrically connected between said line terminal and said load terminal;
   a current sensor adapted to sense current flowing between said line terminal and said load terminal and through said separable contacts, said current associated with one of said types of loads, said sensed current including a plurality of Line cycles;
   a first arc fault detection circuit adapted to generate a first trip signal responsive to said sensed current from said current sensor;
   a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
   a trip circuit adapted to generate a third trip signal responsive to said first trip signal or said second trip signal;
   an operating mechanism adapted to open said separable contacts responsive to said third trip signal;
   wherein said second arc fault detection circuit compares at least one of said samples of said sensed current for the current one of said line cycles to a predetermined fraction of said total current value and compares said total current value to a predetermined value, in order to determine said one of said types of loads; and
   wherein said second arc huh detection circuit collects about 19 of said samples of said sensed current for the current one of said line cycles at a rate of about 32 samples per line cycle; wherein said predetermined value is a first predetermined value; wherein said samples of said sensed current for a current one of said line cycles include a plurality of unfiltered samples and a plurality of filtered samples; wherein a seventeenth unfiltered sample of said sensed current for the current one of said line cycles is greater than said first predetermined value; wherein a fifth filtered sample of said sensed current for the current one of said line cycles is greater than about one eight of said total current value; wherein said total current value is greater than a second predetermined value; and wherein said second arc fault detection circuit responsively determines that said determined one of said types of loads is a vacuum cleaner.

15. An arc fault circuit interrupter for an electrical circuit associated with one of a plurality of different types of loads, said arc fault circuit interrupter comprising:
   a line terminal;
   a load terminal;
   separable contacts electrically connected between said line terminal and said load terminal;
   a current sensor adapted to sense current flowing between said line terminal and said load terminal and through said separable contacts, said current associated with one of said types of loads, said sensed current including a plurality of line cycles;
   a first arc fault detection circuit adapted to generate a first trip signal responsive to said sensed current from said current sensor;
   a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;
an operating mechanism adapted to open said separable contacts responsive to said third trip signal;
wherein said second arc fault detection circuit compares at least one of said samples of said sensed current for the current one of said line cycles to a predetermined fraction of said total current value and compares said total current value to a predetermined value, in order to determine said one of said types of loads; and
wherein said second arc fault detection circuit collects about 19 of said samples of said sensed current for the current one of said line cycles at a rate of about 32 samples per line cycle; wherein said samples of said sensed current for a current one of said line cycles include a plurality of unfiltered samples and a plurality of filtered samples; wherein a fifth filtered sample of said sensed current for the current one of said line cycles is greater than about one half of said total current value; and wherein said second arc fault detection circuit responsively determines that said determined one of said types of loads is a fluorescent bulb.

16. An arc fault circuit interrupter for an electrical circuit associated with one of a plurality of different types of loads, said arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said current associated with one of said types of load, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
a trip circuit adapted to generate a third trip signal responsive to said first trip signal or said second trip signal;
an operating mechanism adapted to open said separable contacts responsive to said third trip signal;
wherein said second arc fault detection circuit compares at least one of said samples of said sensed current for the current one of said line cycles to a predetermined fraction of said total current value and compares said total current value to a predetermined value, in order to determine said one of said types of loads; and
wherein said second arc fault detection circuit collects about 19 of said samples of said sensed current for the current one of said line cycles at a rate of about 32 samples per line cycle; wherein said samples of said sensed current for a current one of said line cycles include a plurality of unfiltered samples and a plurality of filtered samples; wherein said predetermined value is a first predetermined value; wherein a seventeenth filtered sample of said sensed current for the current one of said line cycles is greater than about one fourth of said total current value or greater than said first predetermined value; wherein said total current value is greater than a second predetermined value; and wherein said second arc fault detection circuit responsively determines that said determined one of said types of loads is a compressor.

17. An arc fault circuit interrupter for an electrical circuit associated with one of a plurality of different types of loads, said arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
a trip circuit adapted to generate a third trip signal responsive to said first trip signal or said second trip signal;
an operating mechanism adapted to open said separable contacts responsive to said third trip signal;
wherein said current one of said line cycles corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and wherein said second arc fault detection circuit responds to changes in said sensed current as a function of time; and
wherein said second arc fault detection circuit determines a trip tally based upon said changes in said sensed current as a function of time; wherein said seventeenth one of said samples is greater than a fraction of said total current value; and wherein said second arc fault detection circuit increases said trip tally value by said total current value plus one.

18. The arc fault circuit interrupter of claim 17 wherein said second arc fault detection circuit generates said second trip signal when said trip tally is greater than a first predetermined value and, otherwise, decrements said trip tally.

19. The arc fault circuit interrupter of claim 18 wherein said second arc fault detection circuit generates said second trip signal when said trip tally is greater than a second predetermined value and, otherwise, decrements said trip tally.

20. An arc fault circuit interrupter for an electrical circuit associated with one of a plurality of different types of loads, said arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
a trip circuit adapted to generate a third trip signal responsive to said first trip signal or said second trip signal;
an operating mechanism adapted to open said separable contacts responsive to said third trip signal;
wherein said current one of said line cries corresponds to a line voltage having a line cycle with a positive zero crossing and a negative zero crossing; wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and wherein said second arc fault detection circuit responds to changes in said sensed current as a function of time; and
wherein said second arc fault detection circuit determines a trip tally based upon said changes in said sensed current as a function of time; wherein said seventeenth sample less a sixteenth sample plus an eighteenth sample less said seventeenth sample is greater than two times a difference between a sixteenth sample less a fifteenth sample plus six; and wherein said second arc fault detection circuit increases said trip tally value by said total current value plus one.

21. An arc fault circuit interrupter for an electrical circuit associated with one of a plurality of different types of loads, said arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current for a current one of said line cycles and a plurality of samples of said sensed current for one of said lime cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;
a trip circuit adapted to generate a third trip signal responsive to said first trip signal or said second trip signal;
an operating mechanism adapted to open said separable contacts responsive to said third trip signal;
wherein said second arc fault detection circuit collects about 19 of said samples of said sensed current for the current one of said line cycles at a rate of about 32 samples per line cycle; wherein said current one of said line cycles corresponds to a line voltage having a line cycle with a positive zero crossing and a negative zero crossing; and wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and
wherein said seventeenth one of said samples of said sensed current is greater than or equal to a predetermined value; and wherein said second arc fault detection circuit responsively determines that said determined one of said types of loads is a compressor or a vacuum cleaner.

22. An arc fault circuit interrupter for an electrical circuit associated with one of a plurality of different types of loads, said arc fault circuit interrupter comprising:
a line terminal;
a load terminal;
separable contacts electrically connected between said line terminal and said load terminal;
a current sensor adapted to sense current flowing between said line terminal and said load terminal and through said separable contacts, said current associated with one of said types of loads, said sensed current including a plurality of line cycles;
a first arc fault detection circuit adapted to generate a first trip signal responsive to said sensed current from said current sensor;
a second arc fault detection circuit adapted to collect a plurality of samples of said sensed current fir a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit collects about 19 of said samples of said sensed current for the current one of said line cycles at a rate of about 32 samples per line cycle; wherein said current one of said line cycles corresponds to a line voltage having a line cycle with a positive zero crossing and a negative zero crossing; and wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and wherein a thirteenth one of said samples of said sensed current is less tan or equal to a predetermined value; and wherein said second arc fault detection circuit responsively determines tat said determined one of said types of loads is a computer.

23. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit collects about 19 of said samples of said sensed current for the current one of said line cycles at a rate of about 32 samples per line cycle; wherein said current one of said line cycles corresponds to a line voltage having a line cycle with a positive zero crossing and a negative zero crossing; and wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and wherein a maximum value of said samples of said sensed current is less than or equal to a predetermined value; and wherein said second arc fault detection circuit responsively determines that said determined one of said types of loads is a drill.

24. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second trip signal;

an operating mechanism adapted to open said separable contacts responsive to said third trip signal;

wherein said second arc fault detection circuit collects about 19 of said samples of said sensed current for the current one of said line cycles at a rate of about 32 samples per line cycle; wherein said current one of said line cycles corresponds to a line voltage having a line cycle with a positive zero crossing and a negative zero crossing; and wherein said second arc fault detection circuit collects a first one of said samples of said sensed current at about the positive zero crossing of the line cycle of said line voltage and a seventeenth one of said samples of said sensed current at about the negative zero crossing of the line cycle of said line voltage; and wherein said seventeenth one of said samples of said sensed current is less tan a first predetermined value; wherein a thirteenth one of said samples of said sensed current is greater than a second predetermined value; wherein a maximum value of said samples of said sensed current is greater than a third predetermined value; wherein a fifth one of said samples of said sensed current is greater than a fourth predetermined value; and wherein for each of said fifth one of said samples of said sensed current through and including an eleventh one of said samples of said sensed current, a difference between (a) a second one of said samples after said each of said fifth one of said samples of said sensed current through and including an eleventh one of said samples of said sensed current and (b) said each of said fifth one of said samples of said sensed current through and including an eleventh one of said samples of said sensed current is greater than a fifth predetermined value; and wherein said second arc fault detection circuit responsively determines that said determined one of said types of loads is a dimmer.

25. An arc fault circuit interrupter for an electrical circuit associated with one of a plurality of different types of loads, said arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said current associated with one of said types of loads, said sensed current including a plurality of line cycles;

a first arc fault detection circuit adapted to generate a first trip signal responsive to said sensed current from said current sensor;

a second arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, to employ only a plurality of constant values, said total current value and some of said samples to determine said one of said types of loads, and to generate a second trip signal responsive to said sensed current from said current sensor and said determined one of said types of loads;

a trip circuit adapted to generate a third trip signal responsive to said first trip signal or said second flip signal;

an operating mechanism adapted to open said separable contacts responsive to said third trip signal;

wherein said second arc fault detection circuit collects about 19 of said samples of said sensed current forte current one of said line cycles at a rate of about 32 samples per line cycle; wherein said current one of said line cycles corresponds to a line voltage having a line cycle with a positive zero crossing and a negative zero crossing; and wherein said second arc fault detection circuit collects a first one of said samples of said sensed current at about the positive zero, crossing of the line cycle of said line voltage and a seventeenth one of said samples of said sensed current at about the negative zero crossing of the line cycle of said line voltage; and wherein said seventeenth one of said samples of said sensed current is less than a first predetermined value; wherein a thirteenth one of said samples of said sensed current is greater than a second predetermined value; wherein a maximum value of said samples of said sensed current is greater than a third predetermined value; wherein a fifth one of said samples of said sensed current is greater than a fourth predetermined value; and wherein for each of said fifth one of said samples of said sensed current though and including an eleventh one of said samples of said sensed current, a difference between (a) a second one of said samples after said each of said fifth one of said samples of said sensed current through and including an eleventh one of said samples of said sensed current and said each of said fifth one of said samples of said sensed current through and (b) including an eleventh one of said samples of said sensed current is less than or equal to a fifth predetermined value; and wherein said second arc fault detection circuit responsively determines that said determined one of said types of loads is a drill or a fluorescent bulb.

26. An arc fault circuit interrupter comprising:

a line terminal;

a load terminal;

separable contacts electrically connected between said line terminal and said load terminal;

a current sensor adapted to sense current flowing between said line terminal and said load terminal and through said separable contacts, said sensed current including a plurality of line cycles;

an arc fault detection circuit adapted to collect a plurality of samples of said sensed current for a current one of said line cycles and a plurality of samples of said sensed current for one of said line cycles prior to said current one of said line cycles, to determine a total current value from a peak current of said samples of said sensed current for the current one of said line cycles, and to generate a trip signal responsive to said sensed current from said current sensor; and an operating mechanism adapted to open said separable contacts responsive to said trip signal, wherein said line cycle corresponds to a line voltage having a line cycle with a positive zero crossing and a negative zero crossing; wherein said arc fault detection circuit collects a first one of said samples of said sensed current at about the positive zero crossing of the line cycle of said line voltage and an Nth one of said samples of said sensed current at about the negative zero crossing of the line cycle& of said line voltage; wherein said arc fault detection circuit collects and saves said samples of said sensed current for four consecutive ones of said line cycles; wherein for three consecutive ones of said line cycles said arc fault detection circuit determines differences between each of the samples of one of the line cycles and each of the samples of an immediately previous one of the line cycles and determines a maximum positive value and a maximum negative value from said differences for said three consecutive ones of said line cycles; wherein said arc fault detection circuit determines whether there is one or both of a local maximum value and a local minimum value from said determined maximum positive value and said determined maximum negative value over said three consecutive ones of said line cycles; wherein said arc fault detection circuit determines a hysteresis value based upon said one or both of said local maximum value and said local minimum value for the current one of said line cycles; and wherein said arc fault detection circuit determines if said local maximum value or said local minimum value is greater than said hysteresis value and responsively adds said total current value to a trip tally for said trip signal.

* * * * *